US008418672B2

(12) United States Patent  (10) Patent No.: US 8,418,672 B2
Groves  (45) Date of Patent: Apr. 16, 2013

(54) HIGH LEVERAGE ROTARY INTERNAL COMBUSTION ENGINE

(76) Inventor: James L. Groves, Elbert, CO (US)

(*) Notice: Subject to any disclaimer, the term of this patent is extended or adjusted under 35 U.S.C. 154(b) by 509 days.

(21) Appl. No.: 12/786,315

(22) Filed: May 24, 2010

(65) Prior Publication Data

US 2011/0214638 A1 Sep. 8, 2011

Related U.S. Application Data

(60) Provisional application No. 61/310,460, filed on Mar. 4, 2010.

(51) Int. Cl.
*F02B 53/00* (2006.01)

(52) U.S. Cl.
USPC ............... 123/200; 91/218; 91/223; 123/241; 123/245

(58) Field of Classification Search ............... 418/58, 418/68; 123/18, 200, 241, 245; 91/218, 91/223

See application file for complete search history.

(56) References Cited

U.S. PATENT DOCUMENTS

| | | | | |
|---|---|---|---|---|
| 1,568,051 A | * | 1/1926 | Bullington | 123/245 |
| 1,952,260 A | * | 3/1934 | Kempthorne | 418/68 |
| 3,216,330 A | * | 11/1965 | Heger | 123/235 |
| 3,492,974 A | * | 2/1970 | Kreimeyer | 418/53 |
| 3,947,159 A | | 3/1976 | Mylenek | |
| 4,009,691 A | * | 3/1977 | Sabet | 123/245 |
| 4,024,841 A | * | 5/1977 | Smith | 123/241 |
| 4,519,756 A | * | 5/1985 | Fenton | 418/68 |
| 5,033,429 A | * | 7/1991 | Groves | 123/200 |
| 5,071,328 A | * | 12/1991 | Schlictig | 418/15 |
| 5,138,831 A | | 8/1992 | Cowan, Sr. | |
| 5,147,193 A | * | 9/1992 | Larsen | 418/68 |
| 5,203,297 A | | 4/1993 | Iversen | |
| 5,341,782 A | | 8/1994 | McCall et al. | |
| 5,345,905 A | | 9/1994 | Edwards | |
| 5,372,107 A | | 12/1994 | Smythe | |
| 5,423,297 A | | 6/1995 | Roberts | |
| 5,531,197 A | | 7/1996 | Lobb | |
| 5,640,938 A | | 6/1997 | Craze | |
| 6,082,324 A | | 7/2000 | Liu | |
| 6,164,263 A | | 12/2000 | Saint-Hilaire et al. | |
| 6,167,850 B1 | | 1/2001 | Blount | |
| 6,205,960 B1 | | 3/2001 | Vallejos | |
| 6,247,444 B1 | | 6/2001 | Parks | |
| 6,250,279 B1 | | 6/2001 | Zack | |
| 6,289,867 B1 | * | 9/2001 | Free | 123/245 |
| 6,550,443 B1 | | 4/2003 | Vanmoor | |

(Continued)

*Primary Examiner* — Thomas Denion
*Assistant Examiner* — Thomas Olszewski
(74) *Attorney, Agent, or Firm* — Albert Haegele; Leyendecker & Lemire, LLC

(57) ABSTRACT

An internal combustion engine having a generally rotary design is described. The engine includes a rotor that alternately rotates about first, second, and third axes of rotation as the rotor circulates within the engine. Each axis of rotation is about perpendicular to the other two axes of rotation. The rotor includes two flanges that alternately compress fluid in combustion chambers as the flanges rotatably enter and sweep through compression lobes. Detonation of compressed, combustible fluid occurs in the combustion chambers, force from the detonation driving the rotor about the axes of rotation. The rotor exerts maximum leverage on a power shaft at the point of detonation, and continues to exert similar leverage on the power shaft as the rotor rotates. The engine typically includes one or more power modules, each of the one or more power modules having three compression lobes and three combustion chambers.

15 Claims, 7 Drawing Sheets

U.S. PATENT DOCUMENTS

| | | |
|---|---|---|
| 6,688,276 B2 | 2/2004 | Baptista et al. |
| 6,883,473 B2 | 4/2005 | Wondergem |
| 6,886,527 B2 * | 5/2005 | Regev .......................... 123/245 |
| 6,932,047 B2 | 8/2005 | Watkins et al. |
| 6,941,900 B1 | 9/2005 | Malinov |
| 7,201,134 B2 * | 4/2007 | Guest et al. ................... 123/232 |
| 7,658,168 B2 * | 2/2010 | Huettlin ...................... 123/18 R |
| 8,202,070 B2 * | 6/2012 | Didin et al. .................... 418/68 |
| 2006/0174852 A1 * | 8/2006 | Huettlin ........................ 123/241 |

* cited by examiner

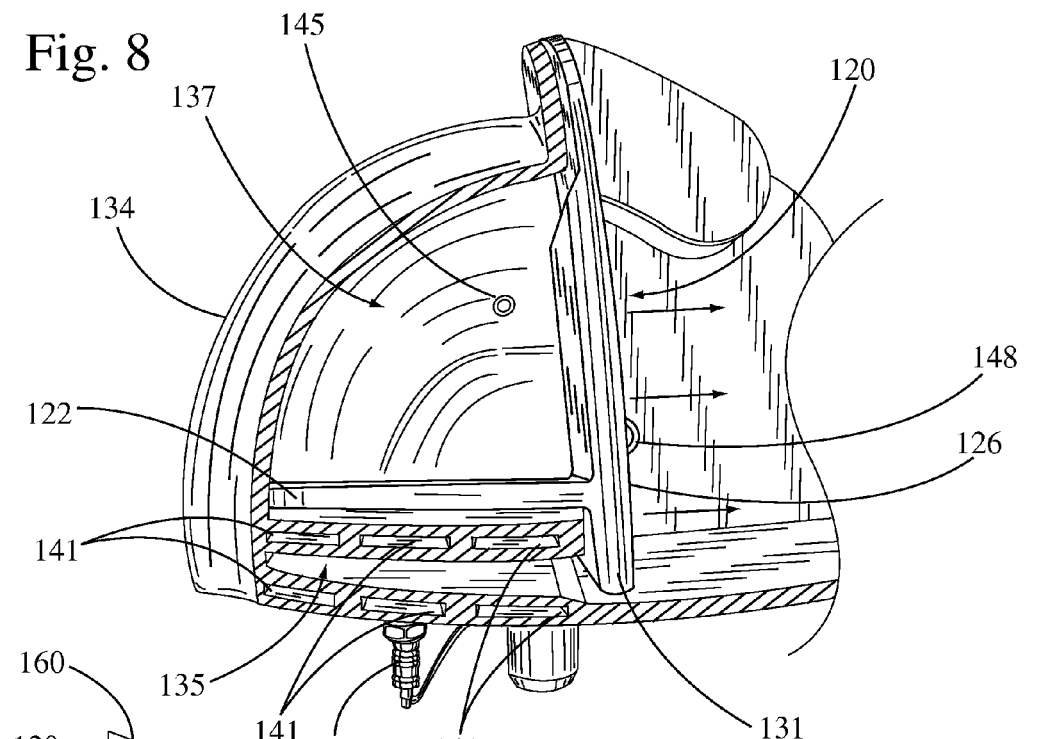
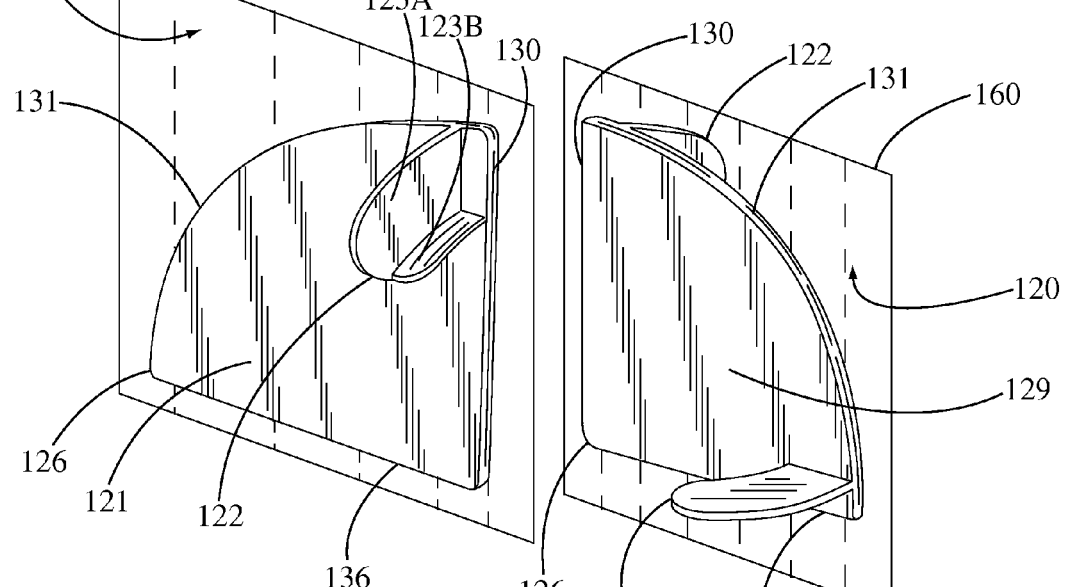
Fig. 8
Fig. 9A
Fig. 9B

HIGH LEVERAGE ROTARY INTERNAL COMBUSTION ENGINE

This application claims priority to, and incorporates by reference, U.S. provisional patent application No. 61/310,460, filed 4, Mar. 2010, titled INTERNAL COMBUSTION ENGINE AND METHODS OF USE, and having the same inventor as the present application. This application also incorporates by reference U.S. Pat. No. 5,033,429, issued 23, Jul. 1991, titled INTERNAL COMBUSTION ENGINE, and having the same inventor as the present application.

FIELD OF THE INVENTION

The present invention relates generally to internal combustion engines.

BACKGROUND

Internal combustion engines are known to use reciprocating piston and rotary designs. In U.S. Pat. No. 5,033,429 (the '429 patent), Groves discloses a particular rotary type internal combustion engine comprising a plurality of vanes disposed on ends of lever arms, the vanes compressing combustible fluid in combustion chambers and harnessing energy released during combustion. A plurality of lever arms extend radially from a common center, and force transmits along the lever arms from the vanes to the common center. At the common center, the force transfers through a flexible joint to rotate a shaft.

The engine disclosed in '429 is simple and efficient, having relatively few moving parts and losing no mechanical energy to reciprocation of the pistons. However, the '429 engine relies solely on positive pressure from combustion to exhaust combustion products from the engine, a space in which the combustion products reside being unswept. Moreover, combustion places large lateral forces on the lever arms, which comprise elongate shafts that are relatively ill adapted to withstand lateral stress.

BRIEF DESCRIPTION OF THE DRAWINGS

FIG. 8 is a cut-away perspective view of a compression lobe according to one embodiment of the present invention.

FIG. 9A is a perspective view of a rotor according to one embodiment of the present invention.

FIG. 9B is a perspective view of a rotor according to one embodiment of the present invention.

DETAILED DESCRIPTION

Figure 1:
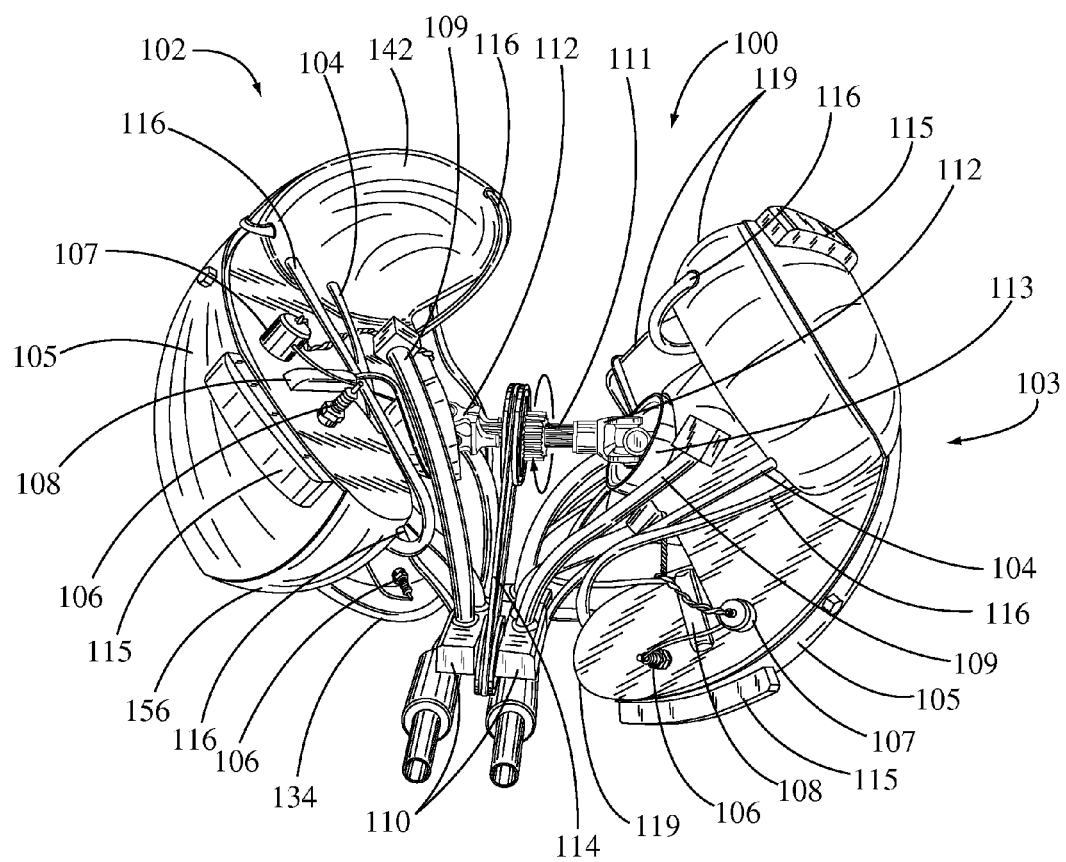
FIG. 1 is a perspective external view of a high leverage rotary internal combustion engine according to one embodiment of the present invention.

Embodiments of the present invention comprise internal combustion engines having a generally rotary design. In an embodiment, the high leverage rotary internal combustion engine comprises one or more power modules, each power module comprising an engine cavity within which a rotor circulates. The rotor comprises two flanges disposed on connecting member. The connecting member has a shape that approximates a quarter of a circle. Thus the connecting member comprises two relatively straight edges having about equal lengths and being disposed at about a right angle to each other, and an arcuate third edge connecting the two straight edges. The connecting member further comprises two broad sides, the two broad sides residing on opposite sides of a bilateral plane. The rotor has bilaterally symmetry about the bilateral plane.

One of the two flanges is disposed proximate an intersection of one of the straight edges and the arcuate third side of the connecting member, and another of the two flanges is disposed proximate an intersection of another of the straight edges and the arcuate third edge of the connecting member. The flanges project away from the bilateral plane of the connecting member at about 90°. One flange is disposed on and projects from one side of the bilateral plane, and the other flange is disposed on and projects from another side of the bilateral plane of the connecting member.

The power module further comprises three compression lobes where combustible fluid is compressed by the flanges, and subsequently detonated. The two flanges alternately engage a compression lobe, each of the three compression lobes receiving one or the other flange as the rotor circulates within the engine cavity, propelled by forces created by detonation of the combustible fluid. The connecting member alternately rotates about one or the other of its straight sides as it circulates, the connecting member acting as a lever arm in transmitting mechanical energy to a power shaft. The high leverage rotary internal combustion engine further comprises a universal joint coupled to the connecting member, through which the connecting member transmits force to a power shaft, the universal joint being turned as the connecting member circulates.

Embodiments of the high leverage rotary internal combustion engine are compact, and therefore occupy relatively little space relative to their displacement. In addition, the high leverage rotary internal combustion engine generates about twice as much power per unit of displacement compared to a typical four cycle engine. The increased power results from detonation occurring in each combustion chamber at or near peak compression once per cycle, as opposed to once every two times a piston reaches top dead center in a typical four stroke reciprocating piston engine. Regardless of whether detonation occurs immediately before, at, or immediately after peak compression, the rotor exerts maximum leverage on the power shaft at the point of detonation. Accordingly, the embodiments of the present high leverage rotary internal combustion engine are adapted to develop relatively high torque. Conversely, the piston rods of conventional reciprocating piston engines do not exert maximum leverage on a crankshaft until about 90° after detonation at about maximum compression/top dead center.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "operationally coupled", as used in this specification and appended claims, refers to a functional connection between identified elements, components, or objects, such that an operation or function of an identified element, component, or object, results in a change in another identified element, component, or object. For instance, where a rotor in an engine is operationally coupled to a power shaft, the rotor is associated with the power shaft in such a way that mechanical energy can be transmitted from one of the rotor and the power shaft to the other of the rotor and a power shaft.

The term "approximately," as used in this specification and appended claims, refers to plus or minus 10% of the value given.

The terms "about," as used in this specification and appended claims, refers to plus or minus 20% of the value given.

The terms "generally" and "substantially," as used in this specification and appended claims, mean mostly, or for the most part.

The term "combustible fluid," as used in this specification and appended claims, refers to one or more gasses, aerosols, liquids, particles, or combinations thereof, which behave generally as a fluid and are capable of undergoing exothermic oxidation. For the purposes of this specification and appended claims, particles of material in solid phase can constitute a fluid, where those particles are suspended in gas or liquid, or are otherwise adapted to behave as a fluid, i.e capable of flowing and changing shape at a steady rate when acted upon by a force tending to change the material's shape. Combustible fluid includes, but is not limited to, gasoline, diesel fuel, kerosene, aviation fuel, methane, ethane, propane, other alkanes or hydrocarbons, methanol, ethanol, flex fuels, butanol, or other alcohols, waxes, fats, fatty acids, carbohydrates, glycerol, or any other material residing in fluid physical state and capable of undergoing exothermic oxidation. Combustible fluid usually also contains an oxidant, which is typically, but not necessarily oxygen.

The term "displacement," as used in this application and appended claims, refers to a volume swept by a vane as the vane makes one sweep through a compression lobe. Thus use of displacement is consistent with and analogous to use of the term with respect to reciprocating piston engines, where volume swept by a piston inside a cylinder in a single movement from top dead center to bottom dead center is the displacement of that cylinder.

The term "internal combustion engine," as used in this specification and appended claims, refers to a device adapted to convert chemical energy from oxidation of fuel to motion and mechanical force. Internal combustion engines typically compress fluid and subsequently detonate compressed combustible fluid in a combustion chamber. Internal combustion engines are typically adapted to continue in motion once the motion has been initiated, i.e. to run, so long as fuel and oxidant are delivered according to operational parameters. The engines typically run until operational parameters are intentionally interrupted, i.e. turned off, by action such as, but not limited to, interrupting operation of a spark plug or other igniter.

The term "combustion chamber", as used in this specification and appended claims, refers to a chamber adapted to temporarily trap a compressed fluid, to facilitate detonation of a compressed, combustible fluid trapped within the chamber, and to withstand high temperatures and pressures associated with the detonation.

The term "combustion product" or "combustion products," as used in this specification and appended claims, refers to compositions created by oxidation of combustible fluid. Combustion products typically include oxidation products such as, but not limited to, water, carbon dioxide, carbon monoxide, oxides of nitrogen, and partially oxidized hydrocarbons or other partially oxidized fuel molecules.

The term "extend" or "extends," as used in this specification and appended claims, means to project, protrude, reach, or span, rather than to lengthen or expand. For instance, a floor of a building typically extends (projects or reaches) horizontally from a wall. As used herein, extend does not connote lengthening, expanding, or changing dimension.

The term "edge," or "edges," as used in this specification and appended claims, refers to a relatively narrow peripheral surface or side of a structure, that resides between wider "broad sides." Conversely, the term "broad side" or "broad sides" refers to a relatively broad peripheral surface or side of a structure. Broad sides may be planar or curved, and are bounded by edges, or comparatively narrow sides. Accordingly, a spherical structure does not have an edge or a broad side.

The term "bilateral symmetry," as used in this specification and appended claims, refers to a structure that has identical or mirror image portions disposed on either side of a plane that bisects the structure. A plane that bisects a structure into identical or mirror image portions is a "bilateral plane."

The term "flange," as used in this specification and appended claims, refers to a structure that protrudes from a surface of an adjoining structure. Flanges can have various shapes, including relatively planar, in which case the node is a blade or vane. Flanges can also be rounded or cylindrical.

The term "sweep" or "sweeping," as used in this specification and appended claims, refers to a structure passing across or through most of a cavity.

The term "adjacent to and continuous with," as used in this specification and appended claims, refers to a compression lobe interior cavity that is distinguishable from an engine cavity, although adjoining and being in fluid communication with the engine cavity.

A First Embodiment High Leverage Rotary Internal Combustion Engine

A first embodiment high leverage rotary internal combustion engine 100 is illustrated in FIG. 1. The first embodiment high leverage rotary internal combustion engine comprises a first power module 102 and a second power module 103, the first and second power modules being mirror images of each other. Each power module comprises three compression lobes and three combustion chambers, the compression lobes and combustion chambers being roughly analogous to cylinders and combustion chambers, respectively, in a reciprocating piston internal combustion engine. Accordingly, compressible fluid is swept from within the compression lobes to reside compressed and restricted within combustion chambers, to form a compressed, combustible fluid. The compressed, combustible fluid is then detonated, and energy from the detonation is harnessed to provide power. Also within each of the power modules resides an engine cavity and rotor, the rotor circulating inside the engine cavity and serving to compress the combustible fluid and to harness energy of detonation.

A first compression lobe 134, second compression lobe 142, and third compression lobe 156 reside on the first power module 102, and other three other compression lobes 119 are visible in FIG. 1 on the second power module 103. Each of the compression lobes is served by an air intake line 104 through which air is delivered under positive pressure to the compression lobe. Concave outer walls 105 encase combustion chambers, an engine cavity, and a rotor within each power module 102, 103.

Spark plugs 106 provide spark to the combustion chambers (not shown in FIG. 1), and pressure transducers 107 measure pressure in combustion chambers. The spark plugs are in communication with the pressure transducers such that timing of spark can be coordinated with combustion chamber pressure. Fuel injectors 108 inject fuel directly into the combustion chambers where the fuel mixes with air, thereby forming a combustible fluid.

Exhaust pipes 109 direct exhaust gas from within the engine cavity to an exhaust gas blowdown turbine 110. Unlike turbochargers in common use, the exhaust gas blowdown turbine does not use exhaust gas energy to drive a compressor to increase pressure of incoming combustion air. Rather, the exhaust gas blowdown turbine uses exhaust gas energy to power a velocity turbine, mechanical energy of the velocity turbine being fed to a power shaft 111. A turbine drive belt 114 delivers mechanical energy from the turbine to the power shaft 111 to supplement power provided to the power shaft from the power modules 102, 103. Power from the power modules is transmitted to the power shaft 111 through universal joints 112. The power shaft and universal joints are isolated from the engine cavity by hemispherical sealing members 113. Coolant manifolds 115 and coolant hoses 116 adapted to deliver fluid into coolant passages that surround combustion chambers are also visible in FIG. 1

Cut-away views of the first power module 102 of the first embodiment high leverage rotary internal combustion engine are illustrated in FIGS. 2-5. The first embodiment comprises two power modules 102, 103 as illustrated in FIG. 1, but only the first power module 102 is visible in FIGS. 2-5. The cut-away views of FIGS. 2-5 show progression of a rotor 120 as it circulates within an engine cavity 128 through a first cycle. A section of the concave outer wall 105 of the first power module is absent in order to provide the cut-away views illustrated in FIGS. 2-5. One cycle comprises a complete circulation of the rotor within the engine cavity, such that the rotor moves through a first ternary portion, second ternary portion, and third ternary portion of the cycle, completing the cycle in a same location in the engine cavity that it began the cycle.

Figure 2:
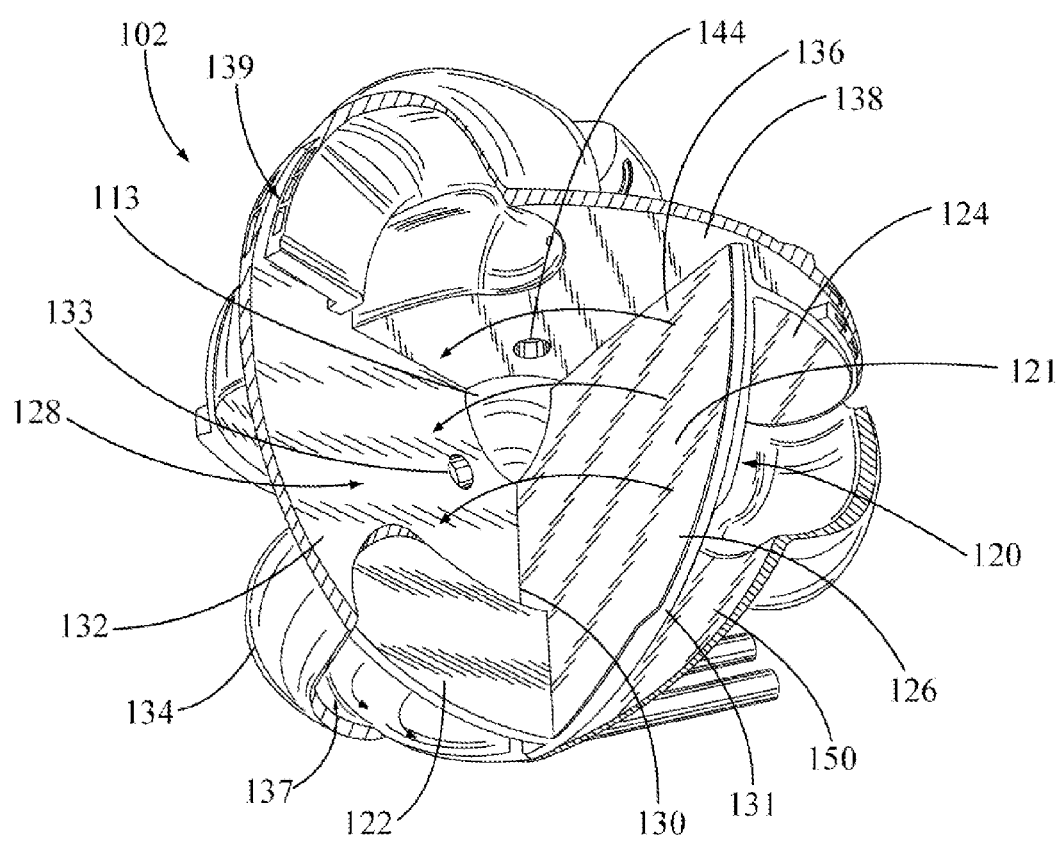
FIG. 2 is a cut-away perspective view of a power module according to one embodiment of the present invention.
Figure 3:
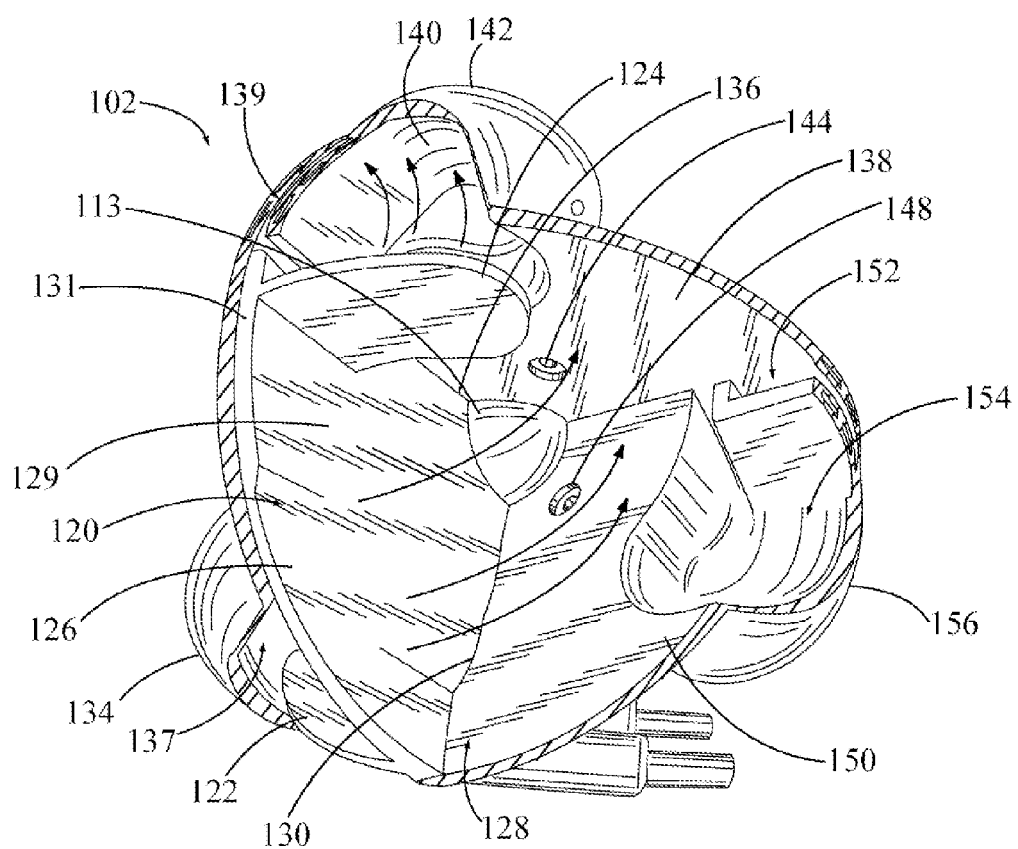
FIG. 3 is a cut-away perspective view of a power module according to one embodiment of the present invention.

The rotor 120, comprising a first flange 122 and a second flange 124 disposed on a connecting member 126, is shown in motion within the engine cavity 128. As best shown in FIG. 2, the first flange 122 intersects a first broad side 121 of the rotor connecting member at about 90°. Similarly, as best shown in FIG. 3, the second flange 124 intersects a second broad side 129 of the rotor connecting member at about 90°. The first and second broad sides of the rotor connecting member are substantially planar.

The engine cavity 128 is partially bounded by a first engine wall 132, a second engine wall 138, and a third engine wall 150. The concave outer wall 105 (shown in FIG. 1) and hemispherical sealing member 113 also bound the engine cavity. Each of the three engine walls is substantially planar and resides approximately perpendicular to the other two engine walls. Thus the first engine wall 132 is approximately perpendicular to the second engine wall 138 and the third engine wall 150, and the second engine wall is approximately perpendicular to the third engine wall.

The connecting member 126 is generally planar and has a shape that approximates ¼ circle, and thus comprises a first edge 130 and a second edge 136, the first edge and second edge being disposed at approximately 90° to each other. An arcuate third edge 131 extends between the first edge and the second edge. The first edge, second edge, and arcuate third edge are bisected by a bilateral plane about which the rotor 120 exhibits bilateral symmetry.

As shown in FIG. 2, which illustrates the rotor 120 in a first ternary portion of the first cycle, the rotor is rotating about the first edge 130 of the connecting member 126 as the connecting member swings toward the first engine wall 132. A first exhaust port 133 resides in the first engine wall 132, and the connecting member pushes combustion products from the engine cavity 128 as it swings toward the first engine wall, the combustion products exiting through the first exhaust port.

Exhaust ports of the first embodiment high leverage rotary internal combustion engine operate without flow through the exhaust ports being controlled by valves or reed valves, such control being unnecessary. Unlike a typical four cycle piston engine, embodiments of the present invention do not require exhaust valves to form a tight seal in order to achieve adequate compression in combustion chambers.

Also occurring during the first ternary portion of the first cycle, the first flange 122 compresses a fluid, the fluid comprising mostly air, in the first compression lobe 134 as the first flange enters and subsequently sweeps through a first compression lobe interior cavity 137. The first compression lobe interior cavity is adjacent to and continuous with the engine cavity 128, but is distinct from the engine cavity. The connecting member circulates with the engine cavity but does not inter an interior cavity of a compression lobe. The first flange and the second flange form substantially fluid tight seals against interior surfaces of compression lobes, and therefore compress fluid as the flanges sweep through the compression lobes. Accordingly, the first flange will eventually push the compressible fluid from the first compression lobe interior cavity into a first combustion chamber 135 (not shown in FIGS. 2-5, best viewed in FIGS. 6-8), where it will be temporarily trapped in a compressed condition. A second combustion chamber 139, which is substantially identical to the first combustion chamber except for its location, is visible in FIG. 2.

As shown in FIG. 3, the connecting member 126 has reached its limit of rotation in one direction, the rotor 120 having completed the first ternary portion of the first cycle. The connecting member 126 is thus disposed substantially parallel to the first wall 132, and is in very close proximity to or up against the first wall 132. At or about this juncture, the compressible fluid is substantially restricted within the first combustion chamber (not shown), where it has reached a state of relative maximum compression by action of the first flange 122.

Where the rotor 120 is so configured, with the connecting member 126 substantially parallel to and in very close proximity to the first wall 132, and the compressible fluid is substantially restricted within the first combustion chamber and has reached a state of relative maximum compression by action of the first flange or the second flange, the rotor is said to be disposed at a first ternary portion terminus. A ternary portion terminus is roughly analogous to top dead center in a reciprocating piston engine. With direct injection mode, fuel is injected into a combustion chamber when the rotor is at or near the ternary portion terminus and the compressible fluid has about reached maximum compression. Thus with direct injection, the fuel remains in the combustion chamber until detonation.

At or about the first ternary portion terminus, fuel is injected into the first combustion chamber and detonation of the resulting combustible fluid is initiated, the detonation propelling the rotor into a second ternary portion of the first cycle, wherein the rotor 120 rotates about a second edge 136 of the connecting member 126 as the connecting member swings toward a second engine wall 138. Concurrently, the second flange 124 enters an interior cavity 140 of a second compression lobe 142. The second flange will eventually push the compressible fluid from the second compression lobe into the second combustion chamber 139. The second combustion chamber 139 is difficult to see in FIG. 3. A second exhaust port 144 resides in the second engine wall. The connecting member clears combustion products from the engine cavity 128 as it swings toward the second engine wall, the combustion products exiting through the second exhaust port 144. Rotor axes of rotation for the first ternary portion and second ternary portion are approximately perpendicular to each other.

In various embodiments of the high leverage rotary internal combustion engine, detonation can be initiated by an igniter such as a spark plug, or may result from heat generated by compression of the fluid, or by hot structures in the combustion chamber. In the first embodiment, detonation is initiated by a spark plug 106, and timing of sparking of the spark plug is linked to a pressure transducer 107. By use of the pressure tranducer, spark plug timing or fuel injection can coincide with a desirable pressure in a combustion chamber. Spark plugs and pressure transducers are not illustrated in FIGS. 2-5 and can be seen in FIGS. 1 and 6-8. In some embodiments, ignition commences upon injection of fuel into the combustion chamber by a fuel injector, and in diesel embodiments of the high leverage rotary internal combustion engine, combustion may be facilitated by preheating the combustion chamber through use of a glow plug.

Figure 4:
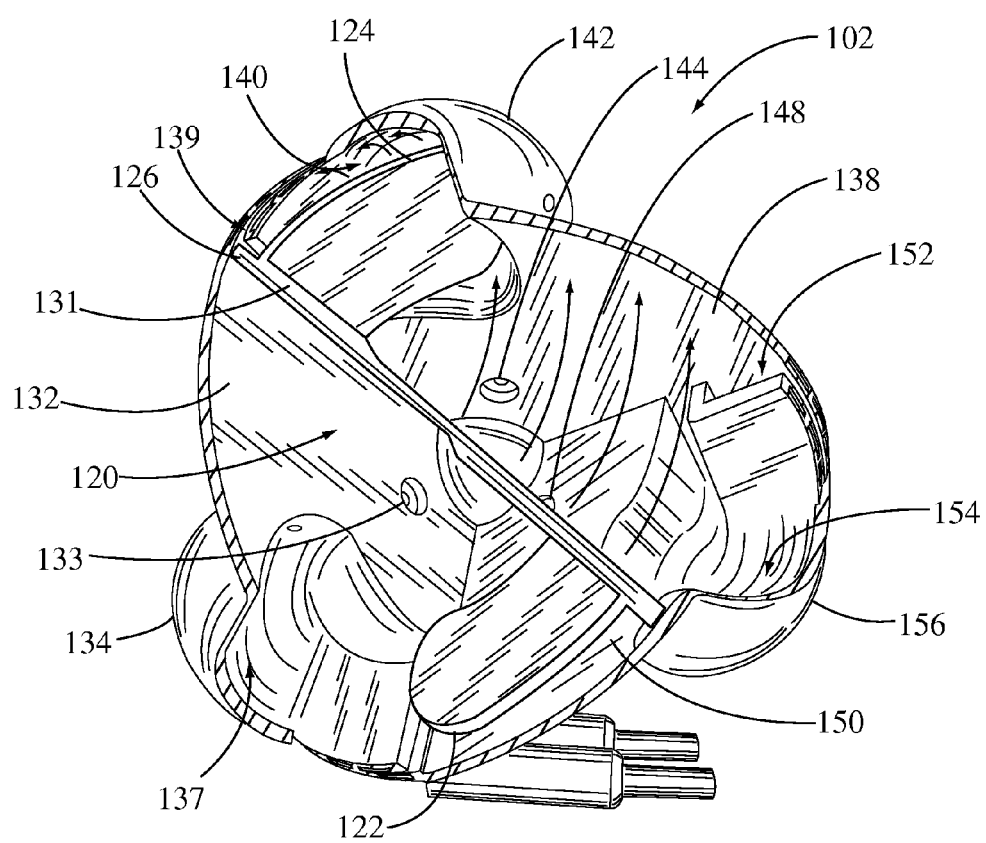
FIG. 4 is a cut-away perspective view of a power module according to one embodiment of the present invention.

As shown in FIG. 4, the rotor 120 is about halfway through the second ternary portion of the first cycle as the connecting member 126 rotates toward the second engine wall 138. Concurrently, the second flange 124 compresses fluid in the second compression lobe 142 as the second flange sweeps through the second compression lobe interior cavity 140. The second flange will eventually push the compressible fluid from the second compression lobe into a second combustion chamber 139, where it will be temporarily trapped in a compressed condition.

All three exhaust ports are visible in FIG. 4, the first exhaust port 133 residing in the first engine wall 132, the second exhaust port 144 residing in the second engine wall 138, and a third exhaust port 148 residing in a third engine wall 150. The third exhaust port is partially obscured by the connecting member 126 in FIG. 4. A third combustion chamber 152 is partially visible in FIG. 4. Compressible fluid is not restricted within the third combustion chamber until the rotor reaches a third ternary portion terminus.

Figure 5:
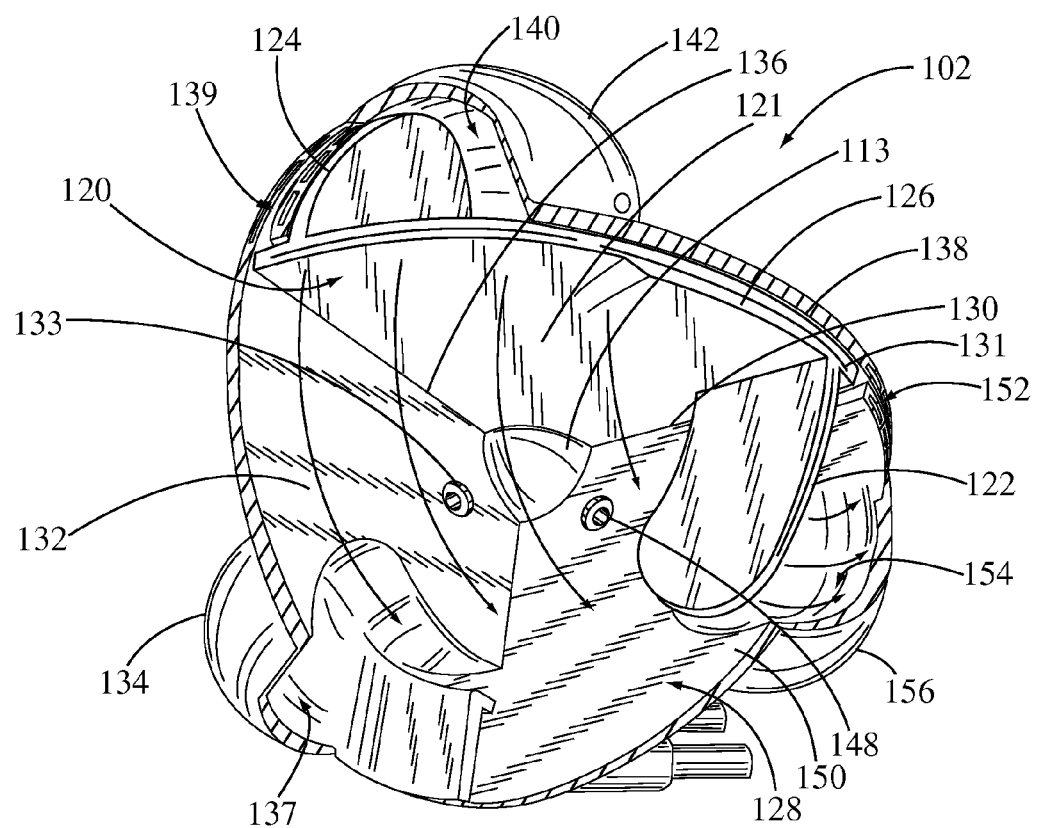
FIG. 5 is a cut-away perspective view of a power module according to one embodiment of the present invention.

As shown in FIG. 5, the connecting member 126 has reached its limit of rotation about the second edge 136, the rotor 120 having completed the second ternary portion of the first cycle. The connecting member 126 is thus disposed with its bilateral plane substantially parallel to and in very close proximity to the second wall 138. Accordingly, the rotor resides at a second ternary portion terminus, and the compressible fluid is substantially restricted within the second combustion chamber 139, where it has reached a state of relative maximum compression, having been compressed by the second flange 124 sweeping the interior volume 140 of the second compression lobe 142.

At or about the second ternary portion terminus, fuel is injected into the second combustion chamber 139, and detonation of the resulting combustible fluid is initiated. The detonation propels the rotor into a third ternary portion of the first cycle, wherein the rotor 120 rotates about the first edge 130 of the connecting member 126 as the connecting member swings toward a third engine wall 150. Concurrently, the first flange 124 enters an interior cavity 154 of a third compression lobe 156. The first flange will eventually push the compressible fluid from the third compression lobe into the third combustion chamber 152. The third exhaust port 144 resides in the third engine wall. The connecting member clears combustion products from the engine cavity as it swings toward the third engine wall, the combustion products exiting the engine cavity through the third exhaust port 148.

An axis of rotation of the rotor 120 during the third ternary portion is about perpendicular to the axes of rotation of the rotor during both the first ternary portion and the second ternary portion of a cycle.

The third ternary portion terminus is not illustrated because completion of the third ternary portion of the first cycle, as well as initiation of a second cycle, is readily understood by persons skilled in the art given the benefit of this disclosure. The second cycle is similar to the first cycle, except that positions of the first edge and the second edge of the connecting member are interchanged. Thus in the second cycle, the rotor rotates about the second edge during the first ternary portion of the second cycle, about the first edge during the second ternary portion of the second cycle, and about the second edge during the third ternary portion of the second cycle. Similarly, positions of the first and second flanges are interchanged during the second cycle relative to the first cycle. During the first ternary portion of the second cycle, the second flange sweeps the first compression lobe interior cavity. Subsequently, the first flange sweeps the second compression lobe interior cavity during the second ternary portion of the second cycle, and then the second flange enters the third compression lobe interior cavity during the third ternary portion of the second cycle. The third cycle will be exactly like the first cycle and the fourth cycle will be exactly like the second cycle. Thus every other cycle is identical, and adjacent cycles are similar but with first and second connecting member edges having interchanged positions in the engine cavity, and first and second flanges having interchanged positions in compression lobes.

As is apparent from the description above, each cycle includes compression of compressible gas in each of the compression lobes, direct injection of fuel into the combustion chamber to form a combustible fluid, and detonation of the combustible fluid in each of the combustion chambers. Thus each cycle is powered by three detonations.

Use of a universal joint or similar structure to couple and transmit power between the rotor and the power shaft is necessitated by the rotor's changes in rotational direction as the rotor circulates within the engine cavity at various angles to a rotational axis of the power shaft. As seen in FIGS. 2-5, the rotor 120 rotates in a first direction during the first ternary portion of a cycle, then changes its direction of rotation by 90° for the second ternary portion of the cycle, and again changes its direction of rotation by 90° again for the third ternary portion of the cycle. Accordingly, orientation of the bilateral plane of the rotor relative to the rotational axis of the power shaft varies continuously from parallel (0°) to 45°. The universal joint enables the power shaft to remain connected to the rotor throughout the rotor's changing angular orientation.

Figure 6:
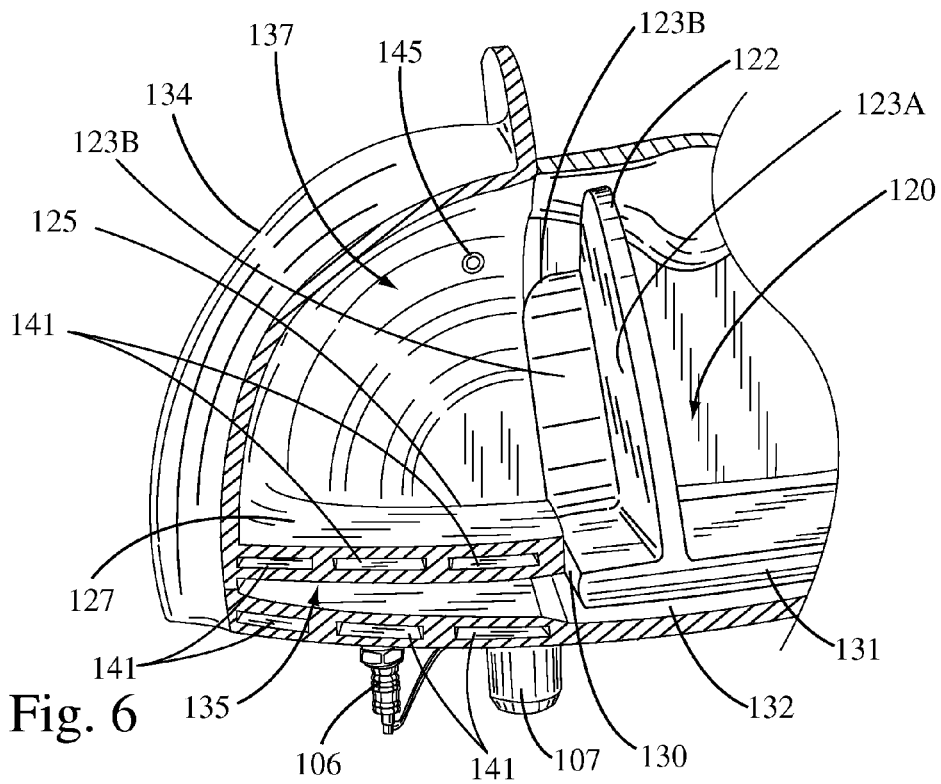
FIG. 6 is a cut-away perspective view of a compression lobe according to one embodiment of the present invention.
Figure 7:
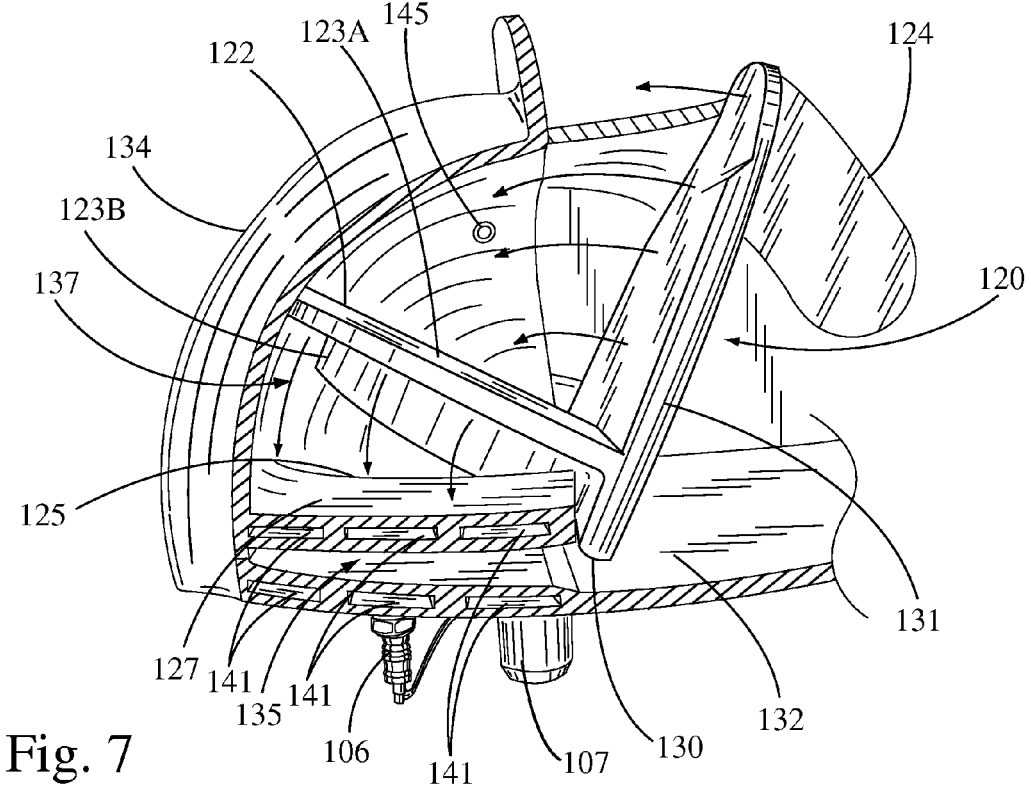
FIG. 7 is a cut-away perspective view of a compression lobe according to one embodiment of the present invention.

Motion of the first flange 122 in the interior cavity 137 of the first compression lobe 134 is best seen in FIGS. 6-8, and is emblematic of motion of either the first or second flange in the first, second, or third compression lobes. In FIG. 6, the rotor 120 has completed the third ternary portion of a cycle, and resides at the third ternary portion terminus. The first flange is thus poised to enter the interior cavity of the first compression lobe. Air flows into the first compression lobe under positive pressure through an air inlet port 145, delivered to the air inlet port by the air inlet line 104 (best viewed in FIG. 1), with the positive pressure being provided by an air pump. The positive pressure can be substantially constant or variable.

As best shown in FIGS. 7 and 8, the first flange 122 enters the interior cavity 137 and begins to compress the compressible fluid in the interior cavity as it sweeps the compressible fluid into the first combustion chamber 135. As the first flange enters the first compression lobe, the first flange forms a substantially gas tight seal against the interior cavity 137, in order to prevent the compressible fluid from escaping. Similarly, the connecting member first edge 130 forms another gas tight seal against the first engine wall 132 and the arcuate third edge 131 forms a gas tight seal against the engine concave outer wall. The engine concave outer wall is not visible in the cut-away views of FIGS. 6-8, having been cut away for viewing purposes. As a perpendicular ledge 123B of the first flange 122 slides under an inner edge 125 of an inner wall 127 of the first combustion chamber 135, the perpendicular ledge forms yet another substantially gas tight seal against the inner edge 125.

The compressible fluid contained in the interior cavity 137 of the first compression lobe 134 may or may not include significant quantities of fuel, depending on fuel injection timing. Under some circumstances, fuel is injected into the first combustion chamber 135 relatively early in the first ternary portion of a cycle, in which case the fuel disperses into the first compression lobe 134 interior cavity 137. In other circumstances, fuel is injected into the first combustion chamber later in the first ternary portion of the cycle, where the rotor is at or proximate the first ternary portion terminus, in which case unburned fuel remains within the combustion chamber prior to detonation.

As shown in FIG. 8, the rotor 120 has reached the first ternary portion terminus and fuel has been injected into the first combustion chamber 135. The compressed, combustible fluid is thus restricted within the first combustion chamber 135. At or proximate the first ternary portion terminus, the compressed, combustible fluid is ignited by a spark from the spark plug 106, and a resulting detonation propels the first flange 122 and the arcuate third edge 131 away from the first compression lobe 134, the connecting member 126 rotating about its second edge 136 (not visible in FIGS. 6-8, shown in FIGS. 2-5).

Combustion chamber coolant passages 141 are best shown in FIGS. 6-8. Aqueous coolant typically circulates through the combustion chamber coolant passages to remove excess heat from the combustion chamber. The combustion chamber coolant passages are in fluid communication with and conduct coolant through peripheral coolant passages that reside within the coolant manifold 115 disposed on the engine exterior. Coolant passes through coolant hoses 116 to a heat exchanger such as a radiator, in a manner familiar to persons of ordinary skill in the art. Coolant manifolds and coolant hoses are not shown in FIGS. 2-9 but are visible in FIG. 1. A water pump circulates water through the coolant system.

The rotor 120 of the first embodiment is illustrated in isolation in FIGS. 9A and 9B, which show that the connecting member 126 is shaped approximately like a quarter of a circle. Thus the first edge 130 and the second edge 136 reside at approximately a 90° angle to each other, and the arcuate third edge 131 extends between the first edge and second edge. Rotation of the rotor 180° about a vertical axis interchanges views illustrated in FIGS. 9A and 9B.

The first flange 122 is best seen in FIG. 9A, and both the first flange and the second flange 124 are visible in FIG. 9B. As best seen in FIG. 9A, the first flange intersects the first broad side 121 of the rotor connecting member 126 at about 90°. The first flange is thus substantially perpendicular to the connecting member, although the first flange is curved slightly so that it is not entirely perpendicular to the connecting member. As best seen in FIG. 9B, the second flange intersects the second broad side 129 of the rotor connecting member 126 at about 90°. The second flange is thus substantially perpendicular to the connecting member, although the second flange is curved slightly so that it is not entirely perpendicular to the connecting member.

As best shown in FIG. 9A, the first flange 122 comprises a compression blade 123A and a perpendicular ledge 123B. As best shown in FIGS. 6 and 7, the perpendicular ledge moves immediately proximate the inner edge 125 of the inner wall 127 of the first combustion chamber 135 as the first flange sweeps through the interior cavity 137 of the first compression lobe 134. As shown in FIG. 7, the perpendicular ledge is beneath the inner wall where it is immediately proximate the inner wall. In FIG. 8, the perpendicular ledge has formed a substantially gas tight seal against the inner edge, which helps restrict the compressed, combustible fluid in the combustion chamber prior to detonation. However, the inner edge 125 and perpendicular ledge 123B are not visible in FIG. 8 because they are obscured by the inner wall 127.

A bilateral plane 160 is illustrated in FIGS. 9A and 9B, bisecting the rotor 120. The rotor exhibits bilateral symmetry about the bilateral plane. The bilateral plane is a mental construct depicted to illustrate bilateral symmetry of the rotor. The bilateral plane is not a physical structure.

Embodiments of high leverage rotary internal combustion engines according to the present invention are immanently scalable, and embodiments can therefore have displacement volumes that differ from the first embodiment, from much smaller to much larger displacement.

Diesel embodiments of the high leverage rotary internal combustion engine typically have compression ratios of about 14:1 or higher, and gasoline embodiments typically have compression ratios around 9:1, although lower and higher compression ratios are contemplated. The high leverage rotary internal combustion engine can generate compression ratios compatible with both gasoline and diesel fuel. Some embodiments are adapted to have variable compression ratios.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

For example, in some embodiments, engine components exposed to high temperatures and pressures comprise ceramic surfaces, the ceramic surfaces being very hard, resistant to wear, and able to withstand very high temperatures. Some embodiments of the high leverage rotary internal combustion engine are air cooled. Variations of high leverage rotary internal combustion engines have only one power module, and other variations have multiple power modules.

In addition, where plumbed appropriately, embodiments of the present invention can function as compressors.

I claim:

1. An internal combustion engine comprising a first power module, the first power module including:
   an engine cavity, the engine cavity being bounded by three engine walls, each of the three engine walls (i) intersecting two of the three engine walls and (ii) comprising a substantially planar surface, the substantially planar surface of the each of the three engine walls being approximately perpendicular to the substantially planar surface of two of the three engine walls;
   a rotor, the rotor residing in the engine cavity and including:
      a first flange, the first flange being substantially perpendicular to a first side of a bilateral plane, the rotor having bilateral symmetry about the bilateral plane;
      a second flange, the second flange being substantially perpendicular to a second side of the bilateral plane, the second side of the bilateral plane being opposite the first side of the bilateral plane;
      a connecting member, the connecting member being coupled directly to the first flange and the second flange and including:
         a first broad side, the first broad side residing on the first side of the bilateral plane and the first flange being directly coupled to the first broad side,
         a second broad side, the second broad side residing on the second side of the bilateral plane and the second flange being directly coupled to the second broad side;
         a first edge residing at a periphery of the first broad side and the second broad side;
         a second edge, the second edge being approximately perpendicular to the first edge and residing at a periphery of the first broad side and the second broad side;
   a plurality of compression lobes, each of the plurality of compression lobes including an interior cavity and a combustion chamber, the interior cavity being adjacent to and continuous with the engine cavity, and a portion of the first flange or a portion of the second flange residing within the interior cavity of at least one of the plurality of compression lobes;
   a plurality of exhaust ports, at least one exhaust port residing in each of the three engine walls, the at least one exhaust port being adapted to exhaust combustion products from the engine cavity through the at least one exhaust port; and
   a plurality of fluid intake ports, the plurality of fluid intake ports being adapted to admit a fluid containing an oxidant into at least one of the plurality of fluid intake ports residing in the interior cavity of the each of the plurality of compression lobes.

2. The internal combustion engine of claim 1, wherein each of the first broad side and the second broad side comprise a substantially planar surface.

3. The internal combustion engine of claim 2, further comprising a second power module, the second power module being a mirror image of the first power module.

4. The internal combustion engine of claim 3, further comprising a power shaft, the first power module and the second power module being operationally coupled to and disposed at opposite ends of the power shaft.

5. A method of using an internal combustion engine comprising:
   providing an internal combustion engine, the internal combustion engine including:
      a first power module including:
         an engine cavity bounded by three engine walls, each of the three engine walls intersecting two of the three engine walls;
         a rotor residing in the engine cavity and including:
            a first flange residing substantially perpendicular to a first side of a bilateral plane, the rotor having bilateral symmetry about the bilateral plane;
            a second flange residing substantially perpendicular to a second side of the bilateral plane, the second side of the bilateral plane being opposite the first side of the bilateral plane;
            a connecting member coupled directly to the first flange and the second flange and including:
               a first broad side residing on the first side of the bilateral plane and the first flange being directly coupled to the first broad side:
               a second broad side residing on the second side of the bilateral plane and the second flange being directly coupled to the second broad side;
               a first edge residing at a periphery of the first broad side and the second broad side;
               a second edge approximately perpendicular to the first edge and residing at a periphery of the first broad side and the second broad side
         a plurality of compression lobes, each of the plurality of compression lobes including an interior cavity and a combustion chamber, the interior cavity being adjacent to and continuous with the engine cavity, and a portion of the first flange or a s portion of the second flange residing within the interior cavity of at least one of the plurality of compression lobes;
   rotating the connecting member about a first axis of rotation, the first edge residing along the first axis of rotation;
   rotating the connecting member about a second axis of rotation, the second axis of rotation being approximately perpendicular to the first axis of rotation and the second edge residing along the second axis of rotation; and
   rotating the connecting about a third axis of rotation, the third axis of rotation being approximately perpendicular to both the first and second axes of rotation; and the first edge residing along the third axis of rotation.

6. The method of claim 5, further comprising each of the first flange and the second flange alternately compressing a compressible fluid in the interior cavity of at least one of the plurality of compression lobes.

7. The method of claim 6, further comprising detonating a compressed, combustible fluid in the combustion chamber of at least one of the plurality of the compression lobes.

8. The method of claim 7, further comprising:
displacing combustion products from the engine cavity through at least one of the plurality of exhaust ports by the connecting member sweeping the engine cavity.

9. The method of claim 8, wherein flow of combustion products from the engine cavity is not controlled by a valve or reed valve.

10. An internal combustion engine comprising:
an engine cavity, the engine cavity being bounded by three engine walls, each of the three engine walls intersecting two of the three engine walls;
a rotor, the rotor residing in the engine cavity and including:
a first flange, the first flange being about perpendicular to a first side of a bilateral plane, the rotor having bilateral symmetry about the bilateral plane;
a second flange, the second flange being about perpendicular to a second side of the bilateral plane, the second side of the bilateral plane being opposite the first side of the bilateral plane;
a connecting member, the connecting member being coupled directly to the first and second flanges and including:
a first edge, the first edge being generally straight;
a second edge, the second edge being generally straight and approximately perpendicular to the first edge;
a third edge, the third edge being generally arcuate and extending from the first edge to the second edge;
a first planar side and a second planar side, the first planar side being substantially planar and the second planar side being substantially planar and generally parallel to the first planar side, and the first and second planar sides residing on opposite sides of the first edge, the second edge, and the third edge; and
a plurality of compression lobes, each of the plurality of compression lobes including an interior cavity and a combustion chamber, the interior cavity being adjacent to and continuous with the engine cavity, and a portion of the first flange or a portion of the second flange residing within the interior cavity of at least one of the plurality of compression lobes.

11. The internal combustion engine of claim 10, wherein the first flange is coupled directly to and extends generally away from the first planar side, and the second flange is coupled to and extends generally away from the second planar side.

12. The internal combustion engine of claim 11, wherein the each of the three engine walls comprises a substantially planar surface, the substantially planar surface of the each of the three engine walls being generally perpendicular to the substantially planar surface of two of the three engine walls, and further comprising:
a plurality of exhaust ports, at least one exhaust port residing in each of the three engine walls, the at least one exhaust port being adapted to exhaust combustion products from the engine cavity through the at least one exhaust port; and
a plurality of fluid intake ports, the plurality of fluid intake ports being adapted to admit a fluid containing an oxidant into at least one of the plurality of fluid intake ports residing in the interior cavity of the each of the plurality of compression lobes.

13. An internal combustion engine comprising:
an engine cavity, the engine cavity being bounded by three engine walls, each of the three engine walls intersecting two of the three engine walls;
a rotor, the rotor residing in the engine cavity and including:
a first flange, the first flange being about perpendicular to a first side of a bilateral plane, the rotor having bilateral symmetry about the bilateral.
a second flange, the second flange being about perpendicular to a second side of the bilateral plane, the second side of the bilateral plane being opposite the first side of the bilateral plane;
a connecting member, the connecting member being coupled directly to the first and second flanges and including:
a first edge, the first edge being generally straight;
a second edge, the second edge being generally straight and approximately perpendicular to the first edge;
a third edge, the third edge being generally arcuate and extending from the first edge to the second edge;
a plurality of compression lobes, each of the plurality of compression lobes including an interior cavity and a combustion chamber, the interior cavity being adjacent to and continuous with the engine cavity, and a portion of the first flange or a portion of the second flange residing within the interior cavity of at least one of the plurality of compression lobes;
wherein:
the connecting member rotates about a first axis of rotation, the first edge residing along the first axis of rotation;
the connecting member rotates about a second axis of rotation, the second axis of rotation being approximately perpendicular to the first axis of rotation and the second edge residing along the second axis of rotation;
the connecting member rotates about a third axis of rotation, the third axis of rotation being approximately perpendicular to both the first and second axes of rotation; and the first edge residing along the third axis of rotation.

14. The internal combustion engine of claim 12, wherein:
the connecting member rotates about a first axis of rotation, the first edge residing along the first axis of rotation;
the connecting member rotates about a second axis of rotation, the second axis of rotation being approximately perpendicular to the first axis of rotation and the second edge residing along the second axis of rotation;
the connecting member rotates about a third axis of rotation, the third axis of rotation being approximately perpendicular to both the first and second axes of rotation; and the first edge residing along the third axis of rotation.

15. The internal combustion engine of claim 14, wherein:
each of the first flange and the second flange alternately compress a compressible fluid in the interior cavity of at least one of the plurality of compression lobes;
a compressed, combustible fluid detonates in the combustion chamber of at least one of the plurality of the compression lobes; and combustion products from the engine cavity are displaced through at least one of the plurality of exhaust ports by the connecting member sweeping the engine cavity.

* * * * *